United States Patent
Gu et al.

(10) Patent No.: US 11,820,006 B2
(45) Date of Patent: Nov. 21, 2023

(54) APPARATUS AND METHOD FOR CALIBRATING LASER DISPLACEMENT SENSOR FOR USE WITH ROBOT

(71) Applicant: ABB Schweiz AG, Baden (CH)

(72) Inventors: Hao Gu, Shanghai (CN); Jiafan Zhang, Shanghai (CN); Yang Shu, Shanghai (CN)

(73) Assignee: ABB Schweiz AG, Baden (CH)

(*) Notice: Subject to any disclaimer, the term of this patent is extended or adjusted under 35 U.S.C. 154(b) by 123 days.

(21) Appl. No.: 17/753,630

(22) PCT Filed: Sep. 27, 2019

(86) PCT No.: PCT/CN2019/108703
§ 371 (c)(1),
(2) Date: Mar. 9, 2022

(87) PCT Pub. No.: WO2021/056461
PCT Pub. Date: Apr. 1, 2021

(65) Prior Publication Data
US 2022/0379499 A1    Dec. 1, 2022

(51) Int. Cl.
*B25J 19/02* (2006.01)
*B25J 9/16* (2006.01)

(52) U.S. Cl.
CPC ........... *B25J 19/022* (2013.01); *B25J 9/1692* (2013.01)

(58) Field of Classification Search
CPC ...... B25J 19/022; B25J 9/1692; B25J 9/1628; B25J 9/1653; B25J 9/1656; B25J 9/1664;
(Continued)

(56) References Cited

U.S. PATENT DOCUMENTS

| 2015/0314450 A1 | 11/2015 | Chiu et al. |
| 2018/0304466 A1 | 10/2018 | Machino et al. |
| 2019/0168385 A1* | 6/2019 | Du .................. B25J 9/1638 |

FOREIGN PATENT DOCUMENTS

| CN | 107650144 A | 2/2018 |
| CN | 108724181 A | 11/2018 |

(Continued)

OTHER PUBLICATIONS

International Search Report and Written Opinion, issued by the ISA/CN National Intellectual Property Administration, regarding corresponding patent application Serial No. PCT/CN2019/108703; dated Jul. 8, 2020; 9 pages.

(Continued)

*Primary Examiner* — Abby Y Lin
*Assistant Examiner* — Esvinder Singh
(74) *Attorney, Agent, or Firm* — Greenberg Traurig, LLP

(57) ABSTRACT

Embodiments of present disclosure relates to an apparatus and a method for calibrating a laser displacement sensor for use with a robot. The apparatus comprises an auxiliary object arranged in a work space of the robot or held by the robot and comprising a planar surface adapted to be detected by the laser displacement sensor; and a controller configured to: determine a characteristic point on the planar surface of the auxiliary object based on a detection result from the laser displacement sensor; cause the laser displacement sensor to point at the characteristic point for plural times with the same angle and different distances to obtain an orientation of the laser displacement sensor; and cause the laser displacement sensor to point at the characteristic point for plural times with different angles and the same distance to obtain a relative position relationship between the laser displacement sensor and the robot.

31 Claims, 6 Drawing Sheets

(58) Field of Classification Search
CPC ...... B25J 9/1674; B25J 13/088; B25J 13/089; G01B 11/026; G01B 21/042; G01B 11/2504; G05B 2219/37582; G05B 2219/39058; G05B 2219/40613; G05B 2219/21065; G05B 2219/37008; G05B 2219/37009; G05B 2219/37017; G05B 2219/37067; G05B 2219/37069; G05B 2219/37129; G05B 2219/39024; G05B 2219/39041; G05B 2219/39047; G05B 2219/39056; G05B 2219/41092; G05B 2219/39033; G05B 2219/40623
See application file for complete search history.

(56) References Cited

FOREIGN PATENT DOCUMENTS

| CN | 108731591 A | 11/2018 |
|---|---|---|
| CN | 108733082 A | 11/2018 |
| WO | 2015070010 A1 | 5/2015 |
| WO | 2015121767 A1 | 8/2015 |
| WO | 2015165062 A1 | 11/2015 |
| WO | 2019100400 A1 | 5/2019 |

OTHER PUBLICATIONS

Yuan Kangzheng; "Approach for calibrating the position of laser displacement sensor and its application"; China Master's Theses Full-Text Database (CMFD); Figure 2.3, 2.6 and 2.7; Jun. 15, 2016; ISSN: 1674-0246; pp. 15-36.

Wang Shenghua et al.; "Hand-eye calibration for the robot by measuring a fixed point from different poses"; Journal of Tsinghua University (Science and Technology); Feb. 28, 2007; No. 2, vol. 47, ISSN: 1000-0054; pp. 165-167.

European Supplementary Search Report issued by European Patent Office regarding corresponding European patent application Serial No. 19947400.8, dated Jun. 19, 2023.

\* cited by examiner

APPARATUS AND METHOD FOR CALIBRATING LASER DISPLACEMENT SENSOR FOR USE WITH ROBOT

CROSS-REFERENCE TO RELATED APPLICATIONS

This is a national stage application which claims priority to International patent application Serial No.: PCT/CN2019/108703, filed on Sep. 27, 2019; and which is herein incorporated by reference in its entirety.

FIELD

Embodiments of present disclosure generally relate to the field of industrial robots, and more particularly, to an apparatus and a method for calibrating a laser displacement sensor for use with a robot.

BACKGROUND

With the development of industrial information technology and intelligent manufacturing, industrial robots are widely used in many manufacturing applications, such as welding, spraying, and assembling of objects. Laser displacement sensors are increasingly used in the industrial robots due to their simple structure, non-contact measurement, high measurement speed and high measurement accuracy.

Typically, a laser displacement sensor is mounted on or near to a robot flange so as to measure a distance from an object to be processed. Through combination with robot motions, such additional displacement sensing can be used for identifying the position and orientation of the object with respect to a robot coordinate system.

The laser displacement sensor needs to be calibrated prior to use. That is, a relative position relationship between the laser displacement sensor and the robot flange needs to be obtained before the laser displacement sensor is used to detect the object such that the measured distance can be precisely converted into a position in the robot coordinate system. On one hand, an orientation of the laser displacement sensor with respect to the robot flange needs to be determined in advance. On the other hand, a relative position between a virtual tool center point of the laser displacement sensor and a tool center point of the robot flange needs to be determined.

In view of the above, there is a need for a simple and precise method for calibrating the relative position relationship between the laser displacement sensor and the robot flange.

SUMMARY

Example embodiments of the present disclosure provide solutions for calibrating a laser displacement sensor for use with a robot.

In a first aspect of the present disclosure, example embodiments of the present disclosure provide an apparatus for calibrating a laser displacement sensor for use with a robot. The apparatus comprises an auxiliary object arranged in a work space of the robot or held by the robot and comprising a planar surface adapted to be detected by the laser displacement sensor, wherein when the auxiliary object is arranged in the work space of the robot, the laser displacement sensor is arranged on or near to a robot flange of the robot, and when the auxiliary object is held by the robot, the laser displacement sensor is arranged at a fixed position in the work space of the robot; and a controller configured to: determine a characteristic point on the planar surface of the auxiliary object based on a detection result from the laser displacement sensor; cause the laser displacement sensor to point at the characteristic point for plural times with the same angle and different distances to obtain an orientation of the laser displacement sensor; and cause the laser displacement sensor to point at the characteristic point for plural times with different angles and the same distance to obtain a relative position relationship between the laser displacement sensor and the robot.

In some embodiments, causing the laser displacement sensor to point at the characteristic point for plural times with the same angle and different distances to obtain the orientation of the laser displacement sensor comprises: causing the robot to move such that the laser displacement sensor points at the characteristic point for plural times with the same angle and different distances; recording a first plurality of positions of a first tool center point of the robot flange; and determining the orientation of the laser displacement sensor based on the first plurality of positions of the first tool center point.

In some embodiments, the orientation of the laser displacement sensor is represented by an orientation of the laser displacement sensor with respect to the robot flange when the auxiliary object is arranged in the work space of the robot, and the orientation of the laser displacement sensor is represented by an orientation of the laser displacement sensor with respect to a robot coordinate system when the auxiliary object is held by the robot.

In some embodiments, causing the laser displacement sensor to point at the characteristic point for plural times with different angles and the same distance to obtain the relative position relationship between the laser displacement sensor and the robot comprises: causing the robot to move such that the laser displacement sensor points at the characteristic point for plural times with different angles and the same distance; recording a second plurality of positions of the first tool center point and respective orientations of the robot flange; and determining the relative position relationship between the laser displacement sensor and the robot based on the second plurality of positions of the first tool center point and the respective orientations of the robot flange.

In some embodiments, the relative position relationship between the laser displacement sensor and the robot is represented by a relative position relationship between a second tool center point of the laser displacement sensor and the first tool center point of the robot flange when the auxiliary object is arranged in the work space of the robot, and wherein the relative position relationship between the laser displacement sensor and the robot is represented by a relative position relationship between the second tool center point of the laser displacement sensor and a robot coordinate system when the auxiliary object is held by the robot.

In some embodiments, the controller is configured to determine the characteristic point by: causing the robot to move such that the laser displacement sensor scans the auxiliary object in a direction parallel to the planar surface of the auxiliary object; in response to a sudden change in the detection result from the laser displacement sensor, determining that an edge point of the planar surface is detected, so as to find at least three edge points of the planar surface; and determining a center of the planar surface based on the at least three edge points of the planar surface as the characteristic point.

In some embodiments, the controller is further configured to determine a pose of the planar surface before the laser displacement sensor scans the auxiliary object in the direction parallel to the planar surface of the auxiliary object.

In some embodiments, the controller is configured to determine the pose of the planar surface by: causing the laser displacement sensor to point at three or more points on the planar surface with the same angle and the same distance; recording a third plurality of positions of a first tool center point of the robot flange corresponding to the three or more points on the planar surface; and determining the pose of the planar surface based on the third plurality of positions of the first tool center point.

In some embodiments, causing the laser displacement sensor to point at the characteristic point for plural times with the same angle and different distances comprises: causing the laser displacement sensor to point at the characteristic point twice with the same angle and different distances.

In some embodiments, causing the laser displacement sensor to point at the characteristic point for plural times with different angles and the same distance comprises: causing the laser displacement sensor to point at the characteristic point for at least four times with different angles and the same distance.

In some embodiments, the relative position relationship is determined through single point constraint.

In some embodiments, the planar surface of the auxiliary object is of a circular shape.

In some embodiments, the auxiliary object is of a cylinder shape or of an inverted truncated cone shape.

In some embodiments, the planar surface of the auxiliary object is of a triangular or rectangular shape.

In some embodiments, the controller is further configured to determine a horizontal orientation of the planar surface with respect to a robot coordinate system.

In a second aspect of the present disclosure, example embodiments of the present disclosure provide a method for calibrating a laser displacement sensor for use with a robot. The method comprises: determining a characteristic point on a planar surface of an auxiliary object based on a detection result from the laser displacement sensor, the auxiliary object being arranged in a work space of the robot or held by the robot, and the planar surface being adapted to be detected by the laser displacement sensor, wherein when the auxiliary object is arranged in the work space of the robot, the laser displacement sensor is arranged on or near to a robot flange of the robot, and when the auxiliary object is held by the robot, the laser displacement sensor is arranged at a fixed position in the work space of the robot; causing the laser displacement sensor to point at the characteristic point for plural times with the same angle and different distances to obtain an orientation of the laser displacement sensor; and causing the laser displacement sensor to point at the characteristic point for plural times with different angles and the same distance to obtain a relative position relationship between the laser displacement sensor and the robot.

In some embodiments, causing the laser displacement sensor to point at the characteristic point for plural times with the same angle and different distances to obtain the orientation of the laser displacement sensor comprises: causing the robot to move such that the laser displacement sensor points at the characteristic point for plural times with the same angle and different distances; recording a first plurality of positions of a first tool center point of the robot flange; and determining the orientation of the laser displacement sensor based on the first plurality of positions of the first tool center point.

In some embodiments, the orientation of the laser displacement sensor is represented by an orientation of the laser displacement sensor with respect to the robot flange when the auxiliary object is arranged in the work space of the robot, and the orientation of the laser displacement sensor is represented by an orientation of the laser displacement sensor with respect to a robot coordinate system when the auxiliary object is held by the robot.

In some embodiments, causing the laser displacement sensor to point at the characteristic point for plural times with different angles and the same distance to obtain the relative position relationship between the laser displacement sensor and the robot comprises: causing the robot to move such that the laser displacement sensor points at the characteristic point for plural times with different angles and the same distance; recording a second plurality of positions of the first tool center point and respective orientations of the robot flange; and determining the relative position relationship between the laser displacement sensor and the robot based on the second plurality of positions of the first tool center point and the respective orientations of the robot flange.

In some embodiments, the relative position relationship between the laser displacement sensor and the robot is represented by a relative position relationship between a second tool center point of the laser displacement sensor and the first tool center point of the robot flange when the auxiliary object is arranged in the work space of the robot, and wherein the relative position relationship between the laser displacement sensor and the robot is represented by a relative position relationship between the second tool center point of the laser displacement sensor and a robot coordinate system when the auxiliary object is held by the robot.

In some embodiments, determining the characteristic point comprises: causing the robot to move such that the laser displacement sensor scans the auxiliary object in a direction parallel to the planar surface of the auxiliary object; in response to a sudden change in the detection result from the laser displacement sensor, determining that an edge point of the planar surface is detected, so as to find at least three edge points of the planar surface; and determining a center of the planar surface based on the at least three edge points of the planar surface as the characteristic point.

In some embodiments, the method further comprises: determining a pose of the planar surface before the laser displacement sensor scans the auxiliary object in the direction parallel to the planar surface of the auxiliary object.

In some embodiments, determining the pose of the planar surface comprises: causing the laser displacement sensor to point at three or more points on the planar surface with the same angle and the same distance; recording a third plurality of positions of a first tool center point of the robot flange corresponding to the three or more points on the planar surface; and determining the pose of the planar surface based on the third plurality of positions of the first tool center point.

In some embodiments, causing the laser displacement sensor to point at the characteristic point for plural times with the same angle and different distances comprises: causing the laser displacement sensor to point at the characteristic point twice with the same angle and different distances.

In some embodiments, causing the laser displacement sensor to point at the characteristic point for plural times with different angles and the same distance comprises: causing the laser displacement sensor to point at the characteristic point for at least four times with different angles and the same distance.

In some embodiments, the relative position relationship is determined through single point constraint.

In some embodiments, the planar surface of the auxiliary object is of a circular shape.

In some embodiments, the auxiliary object is of a cylinder shape or of an inverted truncated cone shape.

In some embodiments, the planar surface of the auxiliary object is of a triangular or rectangular shape.

In some embodiments, the method further comprises: determining a horizontal orientation of the planar surface with respect to a robot coordinate system.

In a third aspect of the present disclosure, example embodiments of the present disclosure provide a computer readable medium having instructions stored thereon, the instructions, when executed on at least one processor, cause the at least one processor to perform the method according to the second aspect of the present disclosure.

According to various embodiments of the present disclosure, the relative position relationship between the laser displacement sensor and the robot can be precisely predetermined in advance. Further, the above embodiments may be implemented in an automatic way without any manual intervention, therefore the calibration process is simple and reliable.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
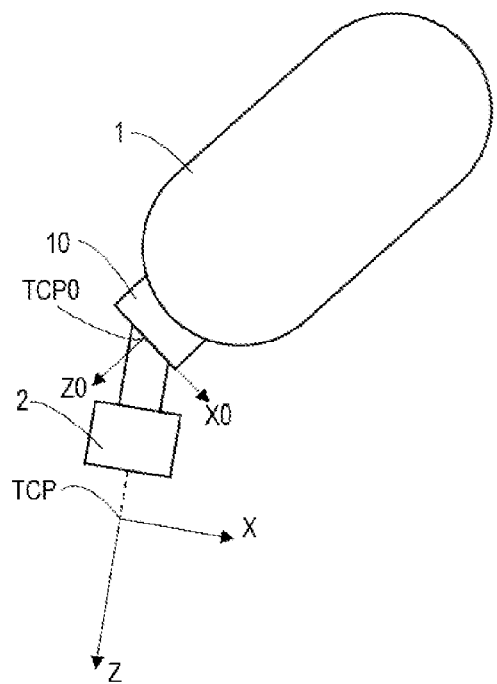
FIG. 1 illustrates a schematic diagram of a robot provided with a laser displacement sensor in accordance with embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

For the sake of description, reference will be made to FIG. 1 to provide a general description of a working environment of the embodiments. FIG. 1 illustrates a schematic diagram of a robot 1 provided with a laser displacement sensor 2 in accordance with embodiments of the present disclosure. As shown in FIG. 1, the laser displacement sensor 2 is mounted on a robot flange 10 for measuring a distance between an object (not shown) to be processed and the laser displacement sensor 2. The robot flange 10 is used for mounting an end tool (not shown), such as a welding tool, a spraying tool, or a gripping tool, and has a first tool center point TCP0. A pose of the robot flange 10 is represented by a first lateral direction X0 and a first vertical direction Z0. The laser displacement sensor 2 has a second tool center point TCP. The second tool center point TCP may be a point on the laser displacement sensor 2 or a predefined point away from the laser displacement sensor 2 by a predefined distance. A pose of the laser displacement sensor 2 is represented by a second lateral direction X and a second vertical direction Z.

In other embodiments, the laser displacement sensor 2 may be arranged on the robot 1 at other positions near to the robot flange 10, rather than directly on the robot flange 10. With such an arrangement, the laser displacement sensor 2 may still precisely obtain the distance from the object to be processed. It is to be understood that the mounting position of the laser displacement sensor 2 is not intended to be limited in the present disclosure.

Prior to use, the laser displacement sensor 2 needs to be calibrated. Specifically, a relative position relationship between the laser displacement sensor 2 and the robot flange 10 needs to be obtained before the laser displacement sensor 2 is used to detect the object such that the measured distance can be converted into a position in the robot coordinate system. On one hand, an orientation of the laser displacement sensor 2 with respect to the robot flange 10 needs to be determined in advance. On the other hand, a relative position between the second tool center point TCP of the laser displacement sensor 2 and the first tool center point TCP0 of the robot flange 10 needs to be determined.

Figure 2:
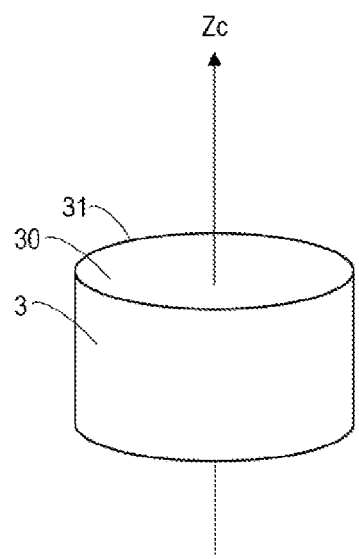
FIG. 2 illustrates a schematic diagram of an auxiliary object in accordance with an embodiment of the present disclosure.

In order to calibrate the laser displacement sensor 2, an auxiliary object 3 is provided in a work space of the robot 1. FIG. 2 illustrates a schematic diagram of the auxiliary object 3 in accordance with an embodiment of the present disclosure. As shown in FIG. 2, the auxiliary object 3 includes a planar surface 30 adapted to be detected by the laser displacement sensor 2. The planar surface 30 has an edge 31. The auxiliary object 3 is generally of a cylinder shape and the planar surface 30 is of a circular shape. The pose of the auxiliary object 3 may be represented by a direction Zc along a center axis of the auxiliary object 3.

Figure 3:
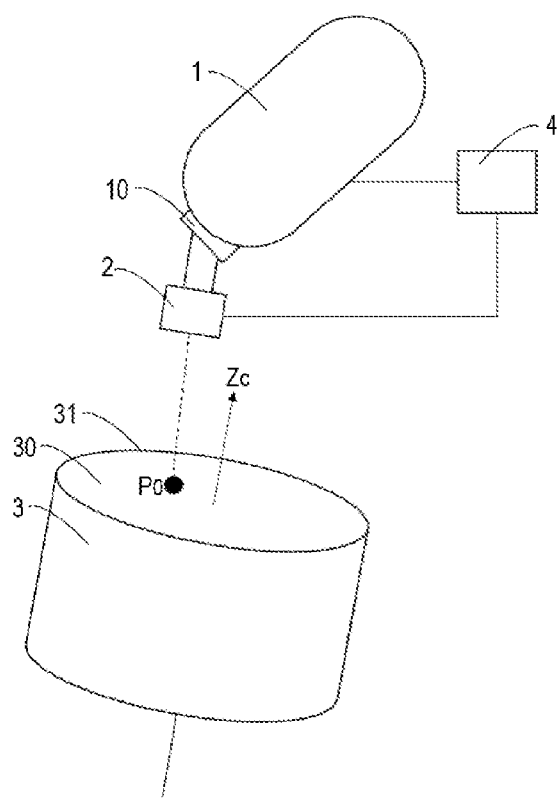
FIG. 3 illustrates a schematic diagram of an apparatus for calibrating the laser displacement sensor for use with the robot in accordance with an embodiment of the present disclosure.

FIG. 3 illustrates a schematic diagram of an apparatus for calibrating the laser displacement sensor 2 in accordance with an embodiment of the present disclosure. As shown, the apparatus includes the auxiliary object 3 as shown in FIG. 2 and a controller 4. The auxiliary object 3 is arranged in the work space of the robot 1. That is, the auxiliary object 3 may be arranged in any position being reachable by the robot 1. The robot 1 and the laser displacement sensor 2 may be driven to move under control of the controller 4. A light beam emitted by the laser displacement sensor 2 may be directed to any position on the planar surface 30 of the auxiliary object 3, e.g., a point P0, and then reflected back into the laser displacement sensor 2 by the planar surface 30. In this way, the distance between the laser displacement sensor 2 and the planar surface 30 can be obtained.

Hereinafter, example operations of the apparatus will be described with reference to FIGS. 4-7 in which the controller 4 is not shown so as to avoid obscuring these figures.

In embodiments of the present disclosure, the auxiliary object 3 may be arranged at any position in the work space of the robot 1. In some cases, the pose and position of the planar surface 30 of the auxiliary object 3 need to be determined firstly.

Figure 4:
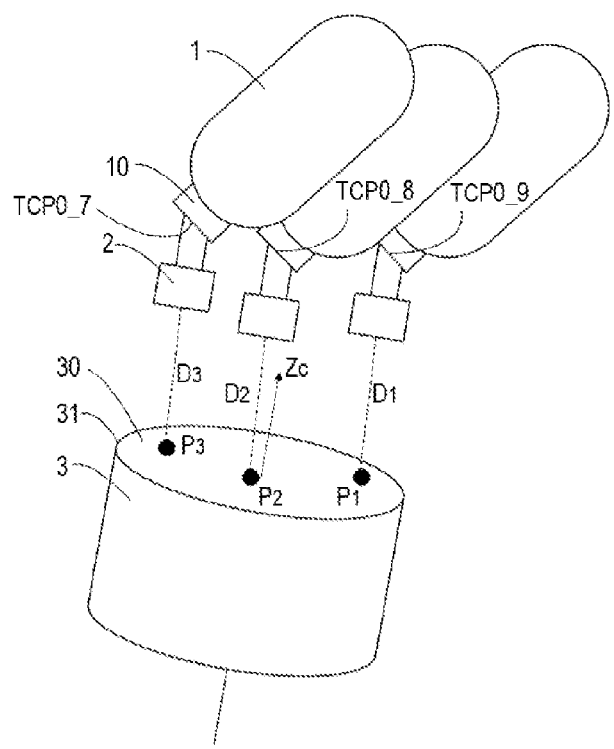
FIG. 4 illustrates an example process for determining a pose of a planar surface of the auxiliary object in accordance with an embodiment of the present disclosure.

FIG. 4 illustrates an example process for determining the pose of the planar surface 30 of the auxiliary object 3 in accordance with an embodiment of the present disclosure. As shown in FIG. 4, the controller 4 causes the laser displacement sensor 2 to point at three points P1, P2, P3 on the planar surface 30 with the same angle and the same distance (D1=D2=D3). The points P1, P2, P3 are non-collinear. Accordingly, the controller 4 records three positions TCP0_7, TCP0_8, TCP0_9 of the first tool center point TCP0 corresponding to the points P1, P2, P3. Since the points P1, P2, P3 are irradiated by the laser displacement sensor 2 with the same angle and the same distance, a plane determined by the positions TCP0_7, TCP0_8, TCP0_9 of the first tool center point TCP0 is parallel to the planar surface 30. Thus, based on the positions TCP0_7, TCP0_8, TCP0_9 of the first tool center point TCP0, the controller 4 may determine the pose of the planar surface 30.

In other embodiments, the controller 4 may cause the laser displacement sensor 2 to point at more than three points on the planar surface 30 with the same angle and the same distance. Likewise, the controller 4 may record the corresponding positions of the first tool center point TCP0 and determine the pose of the planar surface 30 based on the positions of the first tool center point TCP0.

In some embodiments, the auxiliary object 3 may be arranged on the same floor plane as the robot 1. In this case, the pose of the planar surface 30 would be known per se and unnecessary to be determined any more.

Figure 5:
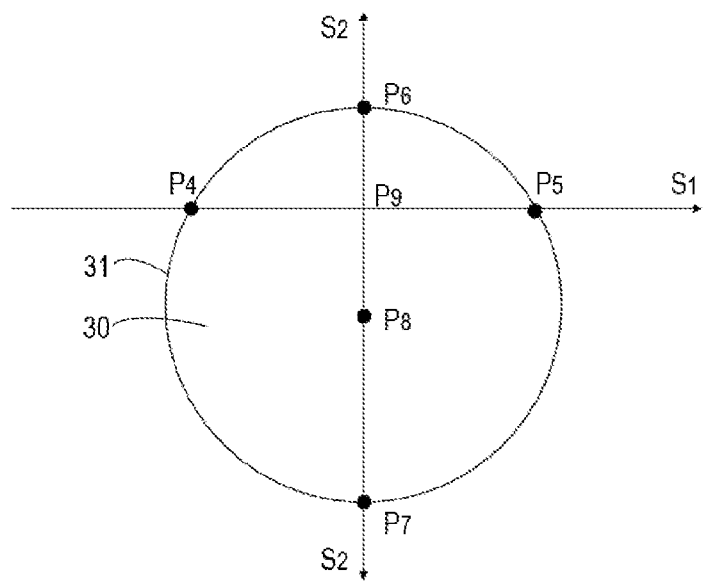
FIG. 5 illustrates an example process for determining a characteristic point on the planar surface in accordance with an embodiment of the present disclosure.

FIG. 5 illustrates an example process for determining a characteristic point on the planar surface 30 in accordance with an embodiment of the present disclosure. As shown in FIG. 5, the controller 4 may cause the laser displacement sensor 2 to move parallel to the planar surface 30 of the auxiliary object 3 based on the pose of the planar surface 30. In response to a sudden change in the detection result from the laser displacement sensor 2, the controller 4 may determine that an edge point at the edge 31 of the planar surface 30 is detected. The sudden change in the detection result means that the change in the detection result exceeds a predefined threshold.

In an embodiment, the laser displacement sensor 2 may first move in a first direction S1 and find two edge points P4, P5 of the planar surface 30. Then, the laser displacement sensor 2 move in a second direction S2 normal to the first direction S1 from the middle point P9 between the edge points P4 and P5 and find another two edge points P6, P7 of the planar surface 30. Then, the controller 4 may determine a middle point (i.e., a center P8 of the planar surface 30) between the edge points P6 and P7 as the characteristic point.

In some embodiments, the laser displacement sensor 2 may scan three edge points at the edge 31 of the planar surface 30. As well known, three non-collinear points determine a circle. Thus, the center P8 of the planar surface 30 may also be found by the controller 4 based on these three edge points. It is to be understood that the controller 4 may determine the center P8 of the planar surface 30 based on at least three edge points at the edge 31 of the planar surface 30.

In embodiments of the present disclosure, the characteristic point is used as a reference point for determining the relative position relationship between the laser displacement sensor 2 and the robot flange 10. It is to be understood that the characteristic point may be a point on the planar surface 30 other than the center P8 in some embodiments.

Figure 6:
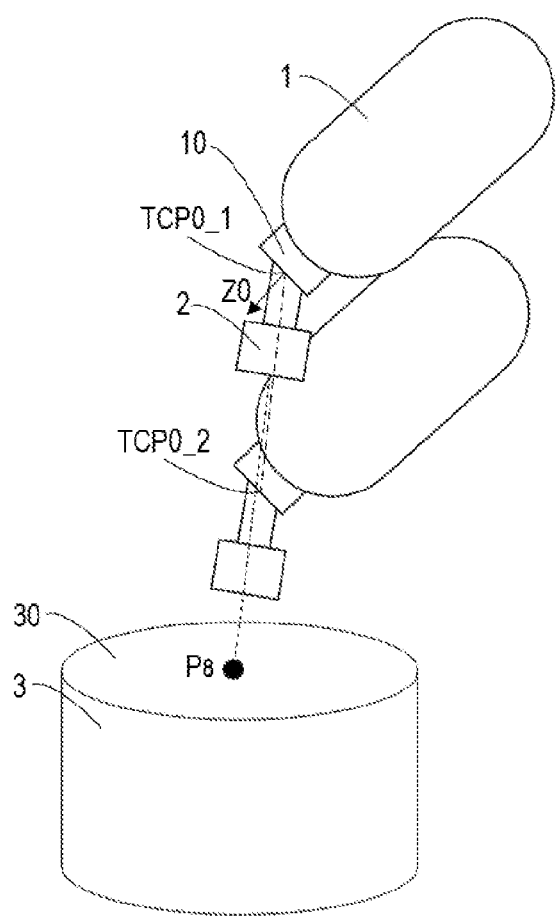
FIG. 6 illustrates an example process for determining an orientation of the laser displacement sensor with respect to the robot flange in accordance with an embodiment of the present disclosure.

FIG. 6 illustrates an example process for determining the orientation of the laser displacement sensor 2 with respect to the robot flange 10 in accordance with an embodiment of the present disclosure. As shown, the controller 4 causes the laser displacement sensor 2 to point at the characteristic point (i.e., the center P8 of the planar surface 30) twice with the same angle and different distances and record two corresponding positions TCP0_1, TCP0_2 of the first tool center point TCP0. Since the laser displacement sensor 2 points at the characteristic point with the same angle and different distances, a line connecting the two positions TCP0_1 and TCP0_2 of the first tool center point TCP0 would be parallel to the light beam of the laser displacement sensor 2. Thus, the orientation of the laser displacement sensor 2 with respect to the robot flange 10, i.e., the orientation of the light beam with respect to the direction Z0, may be determined based on the two positions TCP0_1, TCP0_2 of the first tool center point TCP0.

In some embodiments, the controller 4 may cause the laser displacement sensor 2 to point at the characteristic point for more than two times with the same angle and different distances and record corresponding positions of the first tool center point TCP0. Then, the controller 4 may determine the orientation of the laser displacement sensor 2 with respect to the robot flange 10 based on the positions of the first tool center point TCP0.

Figure 7:
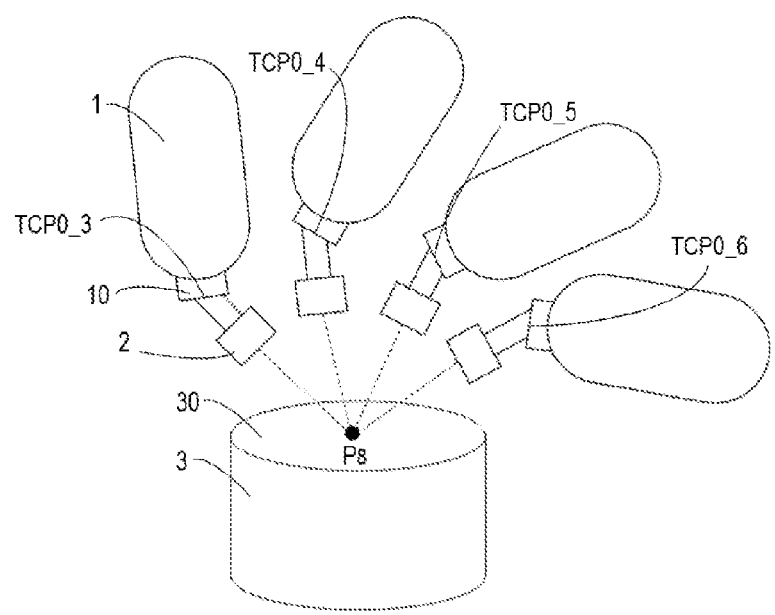
FIG. 7 illustrates an example process for determining a relative position relationship between a second tool center point of the laser displacement sensor and a first tool center point of the robot flange in accordance with an embodiment of the present disclosure.

FIG. 7 illustrates an example process for determining the relative position relationship between the second tool center point TCP of the laser displacement sensor 2 and the first tool center point TCP0 of the robot flange 10 in accordance with an embodiment of the present disclosure. As shown in FIG. 7, the controller 4 causes the laser displacement sensor 2 to point at the characteristic point (i.e., the center P8 of the planar surface 30) for four times with different angles and the same distance and records corresponding positions TCP0_3, TCP0_4, TCP0_5, TCP0_6 of the first tool center point TCP0 and respective orientations of the robot flange 10. Then, the controller 4 may determine the relative position relationship between the second tool center point TCP and the first tool center point TCP0 based on the positions TCP0_3, TCP0_4, TCP0_5, TCP0_6 of the first tool center point TCP0 and the respective orientations of the robot flange 10 through single point constraint in a 4-point calibration method. The 4-point calibration method is a conventional approach for TCP calibration of the robot and would not be described in detail any more herein.

In some embodiments, the controller 4 may determine the relative position relationship between the second tool center point TCP and the first tool center point TCP0 in other manners. For example, the controller 4 may cause the laser displacement sensor 2 to point at the characteristic point for plural times (e.g., more than four times) with different angles and the same distance and record corresponding positions of the first tool center point TCP0 and respective orientations of the robot flange 10. Then, the controller 4 may determine the relative position relationship between the second tool center point TCP and the first tool center point TCP0 based on the positions of the first tool center point TCP0 and the respective orientations of the robot flange 10.

Figure 8:
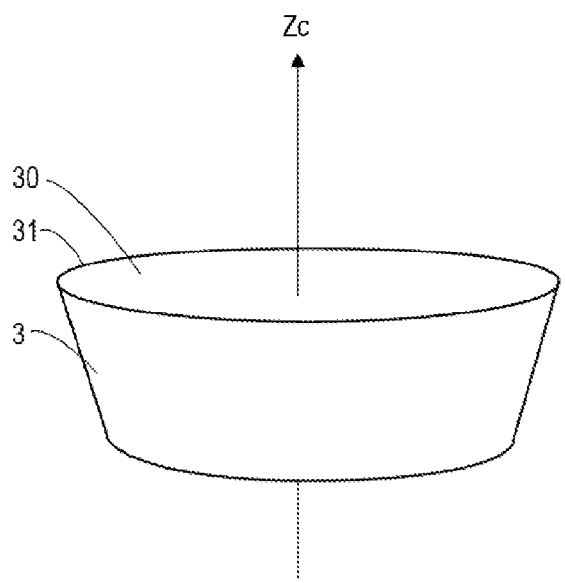
FIG. 8 illustrates a schematic diagram of an auxiliary object in accordance with another embodiment of the present disclosure.

FIG. 8 illustrates a schematic diagram of an auxiliary object 3 in accordance with another embodiment of the present disclosure. The auxiliary object 3 as shown in FIG. 8 is of an inverted truncated cone shape. With such an arrangement, the edge points at the edge 31 of the planar surface 30 may be detected more reliably by the laser displacement sensor 2. Hence, the detection of the characteristic point on the planar surface 30 would be more precise.

It is to be understood that the shape of the auxiliary object 3 is not intended to be limited to embodiments as described above, as long as the auxiliary object 3 is provided with a planar surface adapted to be detected by the laser displacement sensor 2. For example, in some embodiments, the auxiliary object 3 may be of a triangular prism shape or of a cubic shape. The characteristic point may be any point on the planar surface of the auxiliary object 3 and may be determined in the similar process as that of FIGS. 3-5.

According to various embodiments of the present disclosure, the relative position relationship between the laser displacement sensor 2 and the robot flange 10 can be precisely predetermined prior to use of the robot 1. Further, the above embodiments may be implemented in an automatic way without any manual intervention, therefore the calibration process is simple and reliable.

In some embodiments, the laser displacement sensor 2 may be arranged at a fixed position in the work space of the robot 1. Similar to the laser displacement sensor 2 arranged on or near to the robot flange 10 described above, the laser displacement sensor 2 arranged at the fixed position also needs to be calibrated prior to use. Specifically, a relative position relationship between the laser displacement sensor 2 and the robot coordinate system needs to be obtained before the laser displacement sensor 2 is used to detect the object such that the measured distance can be converted into a position in the robot coordinate system. On one hand, an orientation of the laser displacement sensor 2 with respect to the robot coordinate system needs to be determined in advance. On the other hand, a relative position between the second tool center point TCP of the laser displacement sensor 2 and the robot coordinate system needs to be determined.

In order to calibrate the laser displacement sensor 2 arranged at the fixed position in the work space of the robot 1, the auxiliary object 3 as described above may be held by the robot 1 and may be driven to move under control of the controller 4. Through adjustment of the auxiliary object 3, the light beam emitted by the laser displacement sensor 2 may be directed onto the planar surface 30 of the auxiliary object 3. Hence, the laser displacement sensor 2 arranged at the fixed position in the work space of the robot 1 may be calibrated in a similar process as the laser displacement sensor 2 arranged on or near to the robot flange 10. For example, the controller 4 may determine the characteristic point on the planar surface 30 of the auxiliary object 3 based on a detection result from the laser displacement sensor 2. The controller 4 may cause the robot 1 to move such that the laser displacement sensor 2 points at the characteristic point for plural times with the same angle and different distances to obtain an orientation of the laser displacement sensor 2 with respect the robot coordinate system. The controller 4 may cause the robot 1 to move such that the laser displacement sensor 2 points at the characteristic point for plural times with different angles and the same distance to obtain a relative position relationship between the laser displacement sensor 2 and the robot coordinate system.

Moreover, the characteristic point and the pose of the planar surface 30 may be determined in the similar manner as described above. The process for determining the pose of the planar surface 30 and the characteristic point would not be described in detail here anymore.

Figure 9:
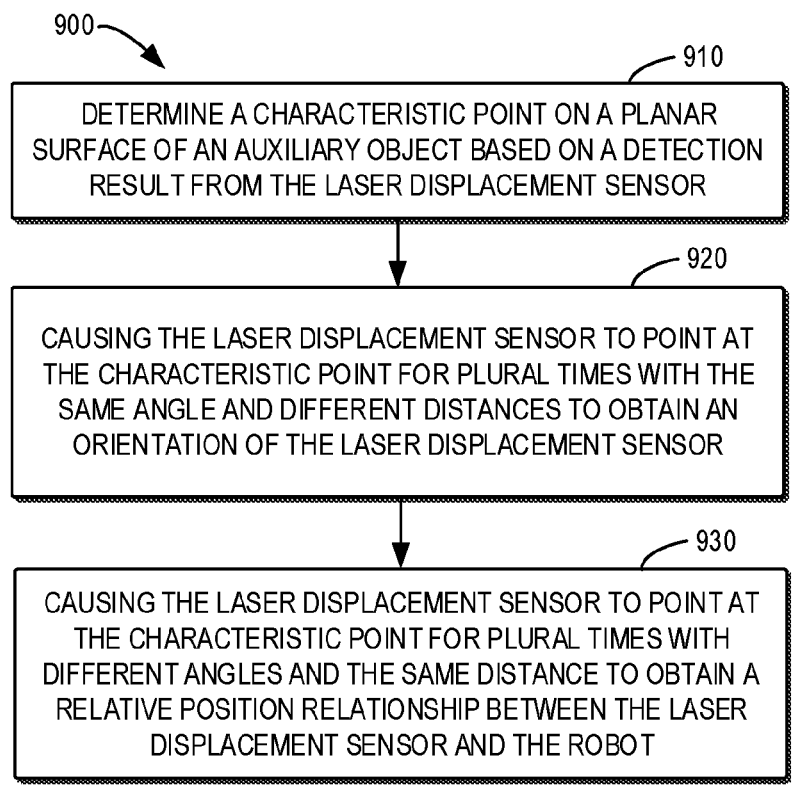
FIG. 9 is a flow chart of a method for calibrating the laser displacement sensor for use with the robot according to embodiments of the present disclosure.

FIG. 9 is a flow chart of a method for calibrating a laser displacement sensor for use with a robot according to embodiments of the present disclosure. The method 900 can be carried out by, for example the apparatus for calibrating the laser displacement sensor 2 as described above with respect to FIGS. 2-8.

At block 910, a characteristic point on a planar surface 30 of an auxiliary object 3 is determined based on a detection result from the laser displacement sensor 2. The auxiliary object 3 is arranged in the work space of the robot 1 or held by the robot 1. The planar surface 30 is adapted to be detected by the laser displacement sensor 2. When the auxiliary object 3 is arranged in the work space of the robot 1, the laser displacement sensor 2 is arranged on or near to a robot flange 10 of the robot 1. When the auxiliary object 3 is held by the robot 1, the laser displacement sensor 2 is arranged at a fixed position in the work space of the robot 1.

At block 920, the laser displacement sensor 2 is caused to point at the characteristic point for plural times with the same angle and different distances to obtain an orientation of the laser displacement sensor 2.

At block 930, the laser displacement sensor 2 is caused to point at the characteristic point for plural times with different angles and the same distance to obtain a relative position relationship between the laser displacement sensor 2 and the robot 1.

In some embodiments, causing the laser displacement sensor 2 to point at the characteristic point for plural times with the same angle and different distances to obtain the orientation of the laser displacement sensor 2 comprises: causing the robot 1 to move such that the laser displacement sensor 2 points at the characteristic point for plural times with the same angle and different distances; recording a first plurality of positions TCP0_1, TCP0_2 of a first tool center point TCP0 of the robot flange 10; and determining the orientation of the laser displacement sensor 2 based on the first plurality of positions TCP0_1, TCP0_2 of the first tool center point TCP0.

In some embodiments, the orientation of the laser displacement sensor 2 is represented by an orientation of the laser displacement sensor 2 with respect to the robot flange 10 when the auxiliary object 3 is arranged in the work space of the robot 1, and the orientation of the laser displacement sensor 2 is represented by an orientation of the laser displacement sensor 2 with respect to a robot coordinate system when the auxiliary object 3 is held by the robot 1.

In some embodiments, causing the laser displacement sensor 2 to point at the characteristic point for plural times with different angles and the same distance to obtain the relative position relationship between the laser displacement sensor 2 and the robot 1 comprises: causing the robot 1 to move such that the laser displacement sensor 2 points at the characteristic point for plural times with different angles and the same distance; recording a second plurality of positions TCP0_3, TCP0_4, TCP0_5, TCP0_6 of the first tool center point TCP0 and respective orientations of the robot flange 10; and determining the relative position relationship between the laser displacement sensor 2 and the robot 1 based on the second plurality of positions TCP0_3, TCP0_4, TCP0_5, TCP0_6 of the first tool center point TCP0 and the respective orientations of the robot flange 10.

In some embodiments, the relative position relationship between the laser displacement sensor 2 and the robot 1 is represented by a relative position relationship between a second tool center point TCP of the laser displacement sensor 2 and the first tool center point TCP0 of the robot flange 10 when the auxiliary object 3 is arranged in the work space of the robot 1, and the relative position relationship between the laser displacement sensor 2 and the robot 1 is represented by a relative position relationship between the second tool center point TCP of the laser displacement sensor 2 and a robot coordinate system when the auxiliary object 3 is held by the robot 1.

In some embodiments, determining the characteristic point includes: causing the robot 1 to move such that the laser displacement sensor 2 scans the auxiliary object 3 in a direction parallel to the planar surface 30 of the auxiliary object 3; in response to a sudden change in the detection result from the laser displacement sensor 2, determining that an edge point of the planar surface 30 is detected, so as to find at least three edge points P4, P5, P6, P7 of the planar surface 30; and determining a center P8 of the planar surface 30 based on the at least three edge points P4, P5, P6, P7 of the planar surface 30 as the characteristic point.

In some embodiments, the method further includes: determining a pose of the planar surface 30 before the laser displacement sensor 2 scans the auxiliary object 3 in the direction parallel to the planar surface 30 of the auxiliary object 3.

In some embodiments, determining the pose of the planar surface 30 includes: causing the laser displacement sensor 2 to point at three or more points P1, P2, P3 on the planar surface 30 with the same angle and the same distance; recording a third plurality of positions TCP0_7, TCP0_8, TCP0_9 of the first tool center point TCP0 corresponding to the three or more points P1, P2, P3 on the planar surface 30; and determining the pose of the planar surface 30 based on the third plurality of positions TCP0_7, TCP0_8, TCP0_9 of the first tool center point TCP0.

In some embodiments, causing the laser displacement sensor 2 to point at the characteristic point for plural times with the same angle and different distances includes: causing the laser displacement sensor 2 to point at the characteristic point twice with the same angle and different distances.

In some embodiments, causing the laser displacement sensor 2 to point at the characteristic point for plural times with different angles and the same distance includes: causing the laser displacement sensor 2 to point at the characteristic point for four times with different angles and the same distance.

In some embodiments, the relative position relationship is determined through single point constraint.

In some embodiments, the planar surface 30 of the auxiliary object 3 is of a circular shape.

In some embodiments, the auxiliary object 3 is of a cylinder shape or of an inverted truncated cone shape.

In some embodiments, the planar surface 30 of the auxiliary object 3 is of a triangular or rectangular shape.

In some embodiments of the present disclosure, a computer readable medium for calibrating a laser displacement sensor for use with a robot is provided. The computer readable medium has instructions stored thereon, and the instructions, when executed on at least one processor, may cause at least one processor to perform the method for calibrating a laser displacement sensor for use with a robot as described in the preceding paragraphs, and details will be omitted hereinafter.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:
1. An apparatus for calibrating a laser displacement sensor for use with a robot, the apparatus comprising:

an auxiliary object arranged in a work space of the robot or held by the robot and comprising a planar surface adapted to be detected by the laser displacement sensor, wherein when the auxiliary object arranged in the work space of the robot, the laser displacement sensor is arranged on or near to a robot flange of the robot, and when the auxiliary object is held by the robot, the laser displacement sensor is arranged at a fixed position in the work space of the robot; and a controller configured to:
  determine a characteristic point on the planar surface of the auxiliary object based on a detection result from the laser displacement sensor;
  cause the laser displacement sensor to point at the characteristic point for plural times with the same angle and different distances to obtain an orientation of the laser displacement sensor; and
  cause the laser displacement sensor to point at the characteristic point for plural times with different angles and the same distance to obtain a relative position relationship between the laser displacement sensor and the robot.

2. The apparatus according to claim 1, wherein causing the laser displacement sensor to point at the characteristic point for plural times with the same angle and different distances to obtain the orientation of the laser displacement sensor comprises:
  causing the robot to move such that the laser displacement sensor points at the characteristic point for plural times with the same angle and different distances;
  recording a first plurality of positions of a first tool center point of the robot flange; and
  determining the orientation of the laser displacement sensor based on the first plurality of positions of the first tool center point.

3. The apparatus according to claim 2, wherein the orientation of the laser displacement sensor is represented by an orientation of the laser displacement sensor with respect to the robot flange when the auxiliary object is arranged in the work space of the robot, and
  wherein the orientation of the laser displacement sensor is represented by an orientation of the laser displacement sensor with respect to a robot coordinate system when the auxiliary object is held by the robot.

4. The apparatus according to claim 2, wherein causing the laser displacement sensor to point at the characteristic point for plural times with different angles and the same distance to obtain the relative position relationship between the laser displacement sensor and the robot comprises:
  causing the robot to move such that the laser displacement sensor points at the characteristic point for plural times with different angles and the same distance;
  recording a second plurality of positions of the first tool center point and respective orientations of the robot flange; and
  determining the relative position relationship between the laser displacement sensor and the robot based on the second plurality of positions of the first tool center point and the respective orientations of the robot flange.

5. The apparatus according to claim 4, wherein the relative position relationship between the laser displacement sensor and the robot is represented by a relative position relationship between a second tool center point of the laser displacement sensor and the first tool center point of the robot flange when the auxiliary object is arranged in the work space of the robot, and wherein the relative position relationship between the laser displacement sensor and the robot is represented by a relative position relationship between the second tool center point of the laser displacement sensor and a robot coordinate system when the auxiliary object is held by the robot.

6. The apparatus according to claim 1, wherein the controller is configured to determine the characteristic point by:
  causing the robot to move such that the laser displacement sensor scans the auxiliary object in a direction parallel to the planar surface of the auxiliary object;
  in response to a sudden change in the detection result from the laser displacement sensor, determining that an edge point of the planar surface is detected, so as to find at least three edge points of the planar surface; and
  determining a center of the planar surface based on the at least three edge points of the planar surface as the characteristic point.

7. The apparatus according to claim 6, wherein the controller is further configured to determine a pose of the planar surface before the laser displacement sensor scans the auxiliary object in the direction parallel to the planar surface of the auxiliary object.

8. The apparatus according to claim 7, wherein the controller is configured to determine the pose of the planar surface by:
  causing the laser displacement sensor to point at three or more points on the planar surface with the same angle and the same distance;
  recording a third plurality of positions of a first tool center point of the robot flange corresponding to the three or more points on the planar surface; and
  determining the pose of the planar surface based on the third plurality of positions of the first tool center point.

9. The apparatus according to claim 1, wherein causing the laser displacement sensor to point at the characteristic point for plural times with the same angle and different distances comprises:
  causing the laser displacement sensor to point at the characteristic point twice with the same angle and different distances.

10. The apparatus according to claim 1, wherein causing the laser displacement sensor to point at the characteristic point for plural times with different angles and the same distance comprises:
  causing the laser displacement sensor to point at the characteristic point for at least four times with different angles and the same distance.

11. The apparatus according to claim 10, wherein the relative position relationship is determined through single point constraint.

12. The apparatus according to claim 1, wherein the planar surface of the auxiliary object is of a circular shape.

13. The apparatus according to claim 12, wherein the auxiliary object is of a cylinder shape or of an inverted truncated cone shape.

14. The apparatus according to claim 1, wherein the planar surface of the auxiliary object is of a triangular or rectangular shape.

15. The apparatus according to claim 14, wherein the controller is further configured to determine a horizontal orientation of the planar surface with respect to a robot coordinate system.

16. A method for calibrating a laser displacement sensor for use with a robot, the method comprising:

determining a characteristic point on a planar surface of an auxiliary object based on a detection result from the laser displacement sensor, the auxiliary object being arranged in a work space of the robot or held by the robot, and the planar surface being adapted to be detected by the laser displacement sensor, wherein when the auxiliary object is arranged in the work space of the robot, the laser displacement sensor is arranged on or near to a robot flange of the robot, and when the auxiliary object is held by the robot, the laser displacement sensor is arranged at a fixed position in the work space of the robot;

causing the laser displacement sensor to point at the characteristic point for plural times with the same angle and different distances to obtain an orientation of the laser displacement sensor; and causing the laser displacement sensor to point at the characteristic point for plural times with different angles and the same distance to obtain a relative position relationship between the laser displacement sensor and the robot.

17. The method according to claim 16, wherein causing the laser displacement sensor to point at the characteristic point for plural times with the same angle and different distances to obtain the orientation of the laser displacement sensor comprises:

causing the robot to move such that the laser displacement sensor points at the characteristic point for plural times with the same angle and different distances;

recording a first plurality of positions of a first tool center point of the robot flange; and determining the orientation of the laser displacement sensor based on the first plurality of positions of the first tool center point.

18. The method according to claim 17, wherein the orientation of the laser displacement sensor is represented by an orientation of the laser displacement sensor with respect to the robot flange when the auxiliary object is arranged in the work space of the robot, and wherein the orientation of the laser displacement sensor is represented by an orientation of the laser displacement sensor with respect to a robot coordinate system when the auxiliary object is held by the robot.

19. The method according to claim 17, wherein causing the laser displacement sensor to point at the characteristic point for plural times with different angles and the same distance to obtain the relative position relationship between the laser displacement sensor and the robot comprises:

causing the robot to move such that the laser displacement sensor points at the characteristic point for plural times with different angles and the same distance;

recording a second plurality of positions of the first tool center point and respective orientations of the robot flange; and determining the relative position relationship between the laser displacement sensor and the robot based on the second plurality of positions of the first tool center point and the respective orientations of the robot flange.

20. The method according to claim 19, wherein the relative position relationship between the laser displacement sensor and the robot is represented by a relative position relationship between a second tool center point of the laser displacement sensor and the first tool center point of the robot flange when the auxiliary object is arranged in the work space of the robot, and wherein the relative position relationship between the laser displacement sensor and the robot is represented by a relative position relationship between the second tool center point of the laser displacement sensor and a robot coordinate system when the auxiliary object is held by the robot.

21. The method according to claim 16, wherein determining the characteristic point comprises:

causing the robot to move such that the laser displacement sensor scans the auxiliary object in a direction parallel to the planar surface of the auxiliary object;

in response to a sudden change in the detection result from the laser displacement sensor, determining that an edge point of the planar surface is detected, so as to find at least three edge points of the planar surface; and determining a center of the planar surface based on the at least three edge points of the planar surface as the characteristic point.

22. The method according to claim 21, further comprising:

determining a pose of the planar surface before the laser displacement sensor scans the auxiliary object in the direction parallel to the planar surface of the auxiliary object.

23. The method according to claim 22, wherein determining the pose of the planar surface comprises:

causing the laser displacement sensor to point at three or more points on the planar surface with the same angle and the same distance;

recording a third plurality of positions of a first tool center point of the robot flange corresponding to the three or more points on the planar surface; and determining the pose of the planar surface based on the third plurality of positions of the first tool center point.

24. The method according to claim 16, wherein causing the laser displacement sensor to point at the characteristic point for plural times with the same angle and different distances comprises:

causing the laser displacement sensor to point at the characteristic point twice with the same angle and different distances.

25. The method according to claim 16, wherein causing the laser displacement sensor to point at the characteristic point for plural times with different angles and the same distance comprises:

causing the laser displacement sensor to point at the characteristic point for at least four times with different angles and the same distance.

26. The method according to claim 25, wherein the relative position relationship is determined through single point constraint.

27. The method according to claim 16, wherein the planar surface of the auxiliary object is of a circular shape.

28. The method according to claim 27, wherein the auxiliary object is of a cylinder shape or of an inverted truncated cone shape.

29. The method according to claim 16, wherein the planar surface of the auxiliary object is of a triangular or rectangular shape.

30. The method according to claim 29, further comprising:

determining a horizontal orientation of the planar surface with respect to a robot coordinate system.

31. A non-transitory computer readable medium having instructions stored thereon, the instructions, when executed on at least one processor, cause the at least one processor to perform the method according to claim 16.

* * * * *